(12) United States Patent
Li et al.

(10) Patent No.: US 12,379,512 B2
(45) Date of Patent: Aug. 5, 2025

(54) DALY DETECTOR OPERABLE IN NEGATIVE ION AND POSITIVE ION DETECTION MODES

(71) Applicant: Thermo Finnigan LLC, San Jose, CA (US)

(72) Inventors: Linfan Li, San Jose, CA (US); Jae C. Schwartz, Gilroy, CA (US); Oleg Silivra, Milpitas, CA (US)

(73) Assignee: Thermo Finnigan LLC, San Jose, CA (US)

( * ) Notice: Subject to any disclaimer, the term of this patent is extended or adjusted under 35 U.S.C. 154(b) by 218 days.

(21) Appl. No.: 18/190,483

(22) Filed: Mar. 27, 2023

(65) Prior Publication Data

US 2023/0243986 A1 Aug. 3, 2023

Related U.S. Application Data

(62) Division of application No. 17/037,270, filed on Sep. 29, 2020, now Pat. No. 11,640,005.

(51) Int. Cl.
*G01T 1/28* (2006.01)
*H01J 49/00* (2006.01)
(Continued)

(52) U.S. Cl.
CPC ............ *G01T 1/28* (2013.01); *H01J 49/0095* (2013.01); *H01J 49/025* (2013.01); *H01J 49/067* (2013.01)

(58) Field of Classification Search
CPC ....... G01T 1/28; H01J 49/0095; H01J 49/025; H01J 49/067
See application file for complete search history.

(56) References Cited

U.S. PATENT DOCUMENTS 3,041,453 A 6/1962 Richard et al.
3,774,028 A 11/1973 Daly
(Continued)

FOREIGN PATENT DOCUMENTS

WO WO-2005001878 A2 1/2005

OTHER PUBLICATIONS

Daly, "Scintillation Type Mass Spectrometer Ion Detector", The Review of Scientific Instruments, vol. 31 (3), 1960, pp. 264-267.
(Continued)

*Primary Examiner* — David E Smith
(74) *Attorney, Agent, or Firm* — Thomas F. Cooney

(57) ABSTRACT

A method of ion detection comprises: (a) setting electrical potentials of a dynode and a scintillator electrode of a Daly detector and of a focusing lens disposed at an ion inlet of the Daly detector so as to detect negatively charged ions received from a mass analyzer or mass filter; (b) transferring the negatively charged ions from the mass analyzer or mass filter to the Daly detector through the lens and detecting said negatively charged ions by a photodetector of the Daly detector; (c) setting electrical potentials of the dynode, the scintillator electrode and the focusing lens of the Daly detector so as to detect positively charged ions received from the mass analyzer or mass filter; and (d) transferring the positively charged ions from the mass analyzer or mass filter to the Daly detector through the lens and detecting said positively charged ions by the photodetector.

13 Claims, 13 Drawing Sheets

(51) Int. Cl.
    *H01J 49/02*     (2006.01)
    *H01J 49/06*     (2006.01)

(56)             References Cited

U.S. PATENT DOCUMENTS

| | | |
|---|---|---|
| 5,464,975 A | 11/1995 | Kirchner et al. |
| 5,576,540 A * | 11/1996 | Jolliffe ................. H01J 49/423 |
| | | 250/282 |
| 6,157,030 A | 12/2000 | Sakairi et al. |
| 6,617,768 B1 | 9/2003 | Hansen |
| 7,714,299 B2 | 5/2010 | Wang et al. |
| 10,593,534 B2 | 3/2020 | Verenchikov et al. |
| 2011/0095177 A1 | 4/2011 | Giannakopulos et al. |
| 2012/0025085 A1 * | 2/2012 | Kotani ...................... G01T 1/28 |
| | | 250/361 R |
| 2013/0187057 A1 | 7/2013 | Kobayashi et al. |
| 2014/0097329 A1 * | 4/2014 | Wadsworth ............... G01J 1/44 |
| | | 250/208.1 |
| 2017/0025265 A1 | 1/2017 | Verenchikov et al. |

OTHER PUBLICATIONS

Hofer et al., "A Simple Axially-Symmetric Quadrupole SIMS Spectrometer", Nuclear Instruments and Methods 149 (1978), pp. 535-541.
Palacz, "An assessment of the linearity of the ion-counting Daly detector and Hamamatsu photomultiplier using NBS U500", Isotopx Technical Note T11010, https://www.isotopx.com/wp-content/uploads/2015/01/T11010-Performance-of-the-ion-counting-Daly-on-the-Phoenix-TIMS.pdf, (2015), 4 pages.
Anonymous, "Ion Collectors and Detectors", URL: https://slidetodoc.com/ion-collectors-and-detectors-some-ideal-characteristics-of/, 9 pages.

\* cited by examiner

DALY DETECTOR OPERABLE IN NEGATIVE ION AND POSITIVE ION DETECTION MODES

CROSS REFERENCE TO RELATED APPLICATION

This application is a Divisional of and claims, under 35 U.S.C. § 120, the benefit of the filing date of and the right of priority to co-pending and commonly assigned U.S. application Ser. No. 17/037,270, which was filed on Sep. 29, 2020, the disclosure of which is hereby incorporated by reference herein in its entirety.

TECHNICAL FIELD

The present disclosure relates to mass spectrometry. More particularly, the present invention relates to ion detectors used in mass spectrometry.

BACKGROUND

The ion detector configuration which comprises a conversion dynode in front of an electron multiplier (EM) is very popular for use in various types of mass spectrometer systems, such as state-of-the-art single and triple quadrupole, ion trap systems, and hybrid mass spectrometers. For example, FIG. 1 schematically illustrates a triple-quadrupole mass spectrometer system, as generally designated by the reference numeral 1 that may employ an electron multiplier detector 10. The operation of mass spectrometer 1 can be controlled and data 11 can be acquired by a control and data system (not depicted) of various circuitry of one or more known types, which may be implemented as any one or a combination of general or special-purpose processors (digital signal processor (DSP)), firmware, software to provide instrument control and data analysis for mass spectrometers and/or related instruments. A sample containing one or more analytes of interest can be ionized via an ion source 5 operating at or near atmospheric pressure. The resultant ions are directed via predetermined ion optics that often can include tube lenses, skimmers, and multipoles, e.g., reference characters 6 and 7, so as to be urged through a series of chambers, e.g., chambers 2, 3 and 4, of progressively reduced pressure that operationally guide and focus such ions to provide good transmission efficiencies. The various chambers communicate with corresponding ports 12 (represented as arrows in FIG. 1) that are coupled to a set of vacuum pumps (not shown) to maintain the pressures at the desired values.

The example mass spectrometer system 1 of FIG. 1 is illustrated with a triple-stage configuration 8 within a high vacuum chamber 9, the triple-stage configuration having sections labeled Q1, Q2 and Q3 electrically coupled to respective power supplies (not shown). The Q1, Q2 and Q3 stages may be operated, respectively, as a first quadrupole mass filter, a fragmentation cell, and a second quadrupole mass filter. Ions that are either filtered, filtered and fragmented or fragmented and filtered within one or more of the stages are passed to the detector 10. Such a detector is beneficially placed at the channel exit of the quadrupole (e.g., Q3 of FIG. 1) to provide data that can be processed into a rich mass spectrum 11 showing the variation of ion abundance with respect to m/z ratio. During conventional operation of a multipole mass filter, such as the quadrupole mass filter Q3 shown in FIG. 1, to generate a mass spectrum, the detector 10 is used to measure the quantity of ions that pass completely through the mass filter as a function of time while the RF and DC voltage amplitudes are scanned.

Generally, the detector 10 (FIG. 2) comprises a conversion dynode and an electron multiplier. The conversion dynode converts a stream of primary ions, as received from an ion outlet of a mass analyzer, into a stream of electrons when used in "positive-ion-detection" mode or else a stream of positively charged particles, when used in the "negative ion detection mode". The electrons or positively-charged particles emitted by the conversion dynode are received by the electron multiplier. In response to the reception of the charged particles, a cascade of multiple secondary electron emission events is stimulated within the electron multiplier in known fashion. The multiple secondary electron emission events that are generated with the electron multiplier ultimately yield an output electron current, at a receiving anode, which may be several orders of magnitude greater than the magnitude of the input current.

The classic channel electron multipliers suffer from fast aging effects. Over the course of operation, the active surface or surfaces of the electron multiplier dynode(s) may rapidly lose their ability to emit secondary electrons, especially when the electron multiplier is operated in a poorly evacuated environment or in an environment that contains organic vapor. Although the discrete dynode type of electron multipliers have been demonstrated to age somewhat more slowly than the continuous dynode type, the loss of gain stability and reduction in operational lifetime of discrete dynode EM detectors is nonetheless problematical. Consequently, frequent calibrations and eventually detector replacement are required to maintain appropriate gain for adequate performance. This is an inconvenience causing downtime and cost to mass spectrometer users.

It has hypothesized that the primary aging mechanism of EM detectors is the so-called "stitching" effect, in which a layer of organic particles adheres to or is embedded in the multiplier's active surface and increases in thickness over time. Among the improvements that have been made in an attempt to overcome the stitching process, one popular trend has been to improve the isolation of the electron multiplier from the rest of the vacuum system that contains the organic molecules. Nonetheless, it is a fundamental challenge to completely seal the multiplier while still allowing the electrons and positive particles from the conversion dynode to effectively penetrate through to be detected and multiplied.

The Daly detector (e.g., see U.S. Pat. No. 3,041,453 and Daly, N. R. "Scintillation type mass spectrometer ion detector." *Review of Scientific Instruments* 31, no. 3 (1960): 264-267) has been found to be a very promising alternative to the electron multiplier in terms of its better gain stability and longer lifetime. FIG. 2 is a schematic diagram of a conventional Daly detector 20. The apparatus 20 includes a conversion dynode 34, a scintillator 31, a thin-film scintillator electrode 32 disposed on a face of the scintillator and a photomultiplier tube (PMT) 27. The conversion dynode 34 is housed within the evacuated interior of a vacuum vessel 21. The vessel 21 has a flanged extension 22 for attachment to a mass spectrometer (not shown). Extension 22 contains a plate 23 having a slit 24 for receiving ions from the mass spectrometer and pumping holes 25 by which the interior is evacuated. The conversion dynode 34 is held in position at a distance, s, from the scintillator 31 with its electrode 32 by an electrified support arm 35 that is coupled to a high-voltage supply. A wall 26 of the vacuum vessel has a recess that supports the PMT 27.

In operation of the conventional Daly detector (FIG. 2), a stream 28 of positively-charged ions is introduced, through slit 24, into the interior of the evacuated vessel 21 at a substantially right angle to the direction in which the conversion dynode is displaced from the scintillator 31. A kilovolt-range negative electrical potential bias applied to the conversion dynode 34 causes the primary positive ions 28 to be deflected onto the conversion dynode. Secondary electrons 29 are generated when the primary positive ions hit the conversion dynode. The electrons are then accelerated to impact the scintillator and thereby generate photons by an appropriate electrical potential difference between the scintillator electrode 32 and the conversion dynode 34. The photons emitted by the scintillator are converted by the PMT into electrical pulses which can be amplified and counted as desired.

Because the dynodes of the PMT are contained in a completely sealed vacuum tube, particles of organic vapor and other contaminants emitted from the mass spectrometer cannot reach the active surface area of these dynodes. The "stitching" effect is thus minimized or eliminated and the overall detector life span is extended, relative to the conventional EM detector. Unfortunately, the PMT scintillator is unresponsive to impacts of positively charged particles, as would conventionally be expected to be emitted from a conversion dynode that receives negative ions from an ion outlet of a mass analyzer. Therefore, the Daly detector has only been designed for, and demonstrated to work only in, the positive ion detection mode of mass spectrometer operation. Attempting to detect negative ions using a conversion dynode as a front end to a Daly detector results in no useful signal.

SUMMARY

In order to address the above-noted deficiencies in the art of ion detection, this disclosure teaches a novel detector that has the advantages of the PMT-based Daly detector but can also work in both the positive and the negative Ion detection modes. Furthermore, this novel detector is small in size and therefore is more suitable for a compact mass spectrometer system.

According to a first aspect of the present teachings, an ion detector that can detect either positive or negative ions is disclosed, the ion detector comprising: an ion inlet comprising an ion focusing lens; a dynode having a surface configured to intercept, within a zone of interception, a stream of ions passing through the ion focusing lens, wherein a plane that is tangent to the dynode surface at the zone of interception is disposed at an angle to a line that passes through the center of the dynode surface and the center of the focusing lens; a scintillator having a surface that is configured to receive secondary electrons emitted from the zone of interception; a scintillator electrode affixed to the scintillator surface; a photodetector configured to receive photons emitted by the scintillator and to generate an electric signal in response thereto; and one or more power supplies electrically coupled to the focusing lens, the dynode, the scintillator electrode and the photodetector. The photodetector may comprise any device that may suitably detect wavelengths of light emitted by the scintillator. Accordingly, the photodetector may comprise, without limitation, a photomultiplier tube or any suitable semiconductor light sensor device, either as a standalone sensor or as a plurality of individual sensors in an array format. Suitable semiconductor light sensor devices include, without limitation, solid-state silicon photomultipliers, charge-coupled devices, active-pixel sensors and photodiodes of various types.

The one or more power supplies may be configured to provide a first set of voltages to the ion lens, the dynode and the scintillator electrode, the first set of voltages corresponding to the detection of positively charged ions by the ion detector, and to provide a second set of voltages to the ion lens, the dynode and the scintillator electrode, the second set of voltages corresponding to the detection of negatively charged ions by the ion detector.

According to various embodiments, the angle is within the range of twenty degrees to thirty degrees, inclusive. According to various embodiments, the dynode surface is a concave reentrant surface. According to various embodiments, the scintillator has a thin-film metallic coating on the surface of the scintillator. According to various embodiments, a line that passes through the center of the dynode surface and the center of the scintillator surface makes an angle of between 80 degrees and 110 degrees with the line that passes through the center of the dynode surface and the center of the focusing lens. According to various embodiments, the dynode is disposed such that no portion of the dynode is closer than three millimeters from the scintillator electrode and also such that no portion of the dynode surface is further than seven millimeters from the scintillator electrode.

According to various embodiments, the ion lens comprises a tube lens or a ring lens that is configured to intercept ions emitted axially from a multipole mass analyzer or mass filter. According to various other embodiments, the ion lens comprises a pair of electrodes, each electrode having an edge, the edges aligned parallel to one another and defining a gap therebetween and wherein the gap is configured to intercept ions emitted radially from a linear ion trap.

According to a second aspect of the present teachings, a method of ion detection comprises: (a) setting electrical potentials of a dynode and a scintillator electrode of a Daly detector and of a focusing lens disposed at an ion inlet of the Daly detector so as to detect negatively charged ions received at the ion inlet from a mass analyzer or mass filter; (b) transferring the negatively charged ions from the mass analyzer or mass filter to the Daly detector through the focusing lens and detecting a first signal that corresponds to detection of the negatively charged ions by a photodetector of the Daly detector; (c) setting electrical potentials of the dynode, the scintillator electrode and the focusing lens of the Daly detector so as to detect positively charged ions received at the ion inlet from the mass analyzer or mass filter; and (d) transferring the positively charged ions from the mass analyzer or mass filter to the Daly detector through the focusing lens and detecting a second signal that corresponds to detection of the positively charged ions by the photodetector of the Daly detector. The photodetector may comprise any device that may suitably detect wavelengths of light emitted by the scintillator. Accordingly, the photodetector may comprise, without limitation, a photomultiplier tube or any suitable semiconductor light sensor device, either as a standalone sensor or as a plurality of individual sensors in an array format. Suitable semiconductor light sensor devices include, without limitation, solid-state silicon photomultipliers, charge-coupled devices, active-pixel sensors and photodiodes of various types.

According to third aspect of the present teachings, a method of ion detection comprises: (a) setting electrical potentials of a dynode and a scintillator electrode of a Daly detector and of a focusing lens disposed at an ion inlet of the Daly detector so as to detect positively charged ions received at the ion inlet from a mass analyzer or mass filter; (b) transferring the positively charged ions from the mass analyzer or mass filter to the Daly detector through the focusing lens and detecting a first signal that corresponds to detection of the positively charged ions by a photodetector of the Daly detector; (c) setting electrical potentials of the dynode, the scintillator electrode and the focusing lens of the Daly detector so as to detect negatively charged ions received at the ion inlet from the mass analyzer or mass filter; and (d) transferring the negatively charged ions from the mass analyzer or mass filter to the Daly detector through the focusing lens and detecting a second signal that corresponds to detection of the negatively charged ions by the photodetector of the Daly detector The photodetector may comprise any device that may suitably detect wavelengths of light emitted by the scintillator. Accordingly, the photodetector may comprise, without limitation, a photomultiplier tube or any suitable semiconductor light sensor device, either as a standalone sensor or as a plurality of individual sensors in an array format. Suitable semiconductor light sensor devices include, without limitation, solid-state silicon photomultipliers, charge-coupled devices, active-pixel sensors and photodiodes of various types.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1:
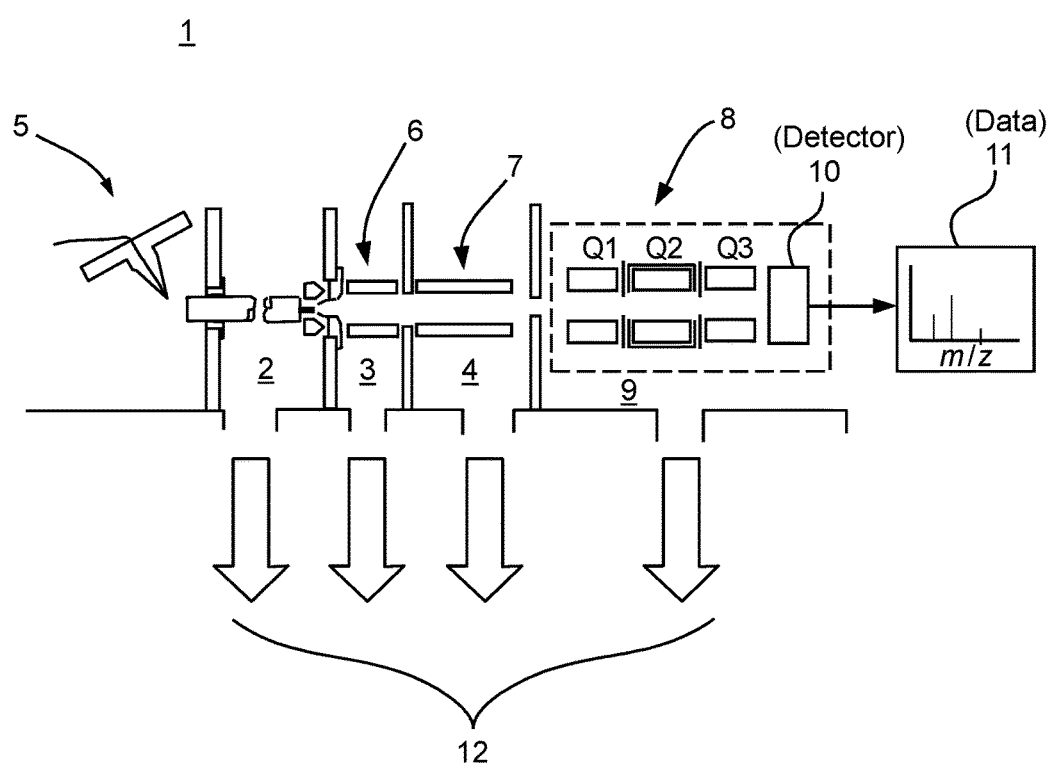
FIG. 1 is a schematic illustration of a triple-quadrupole mass spectrometer system.
Figure 2:
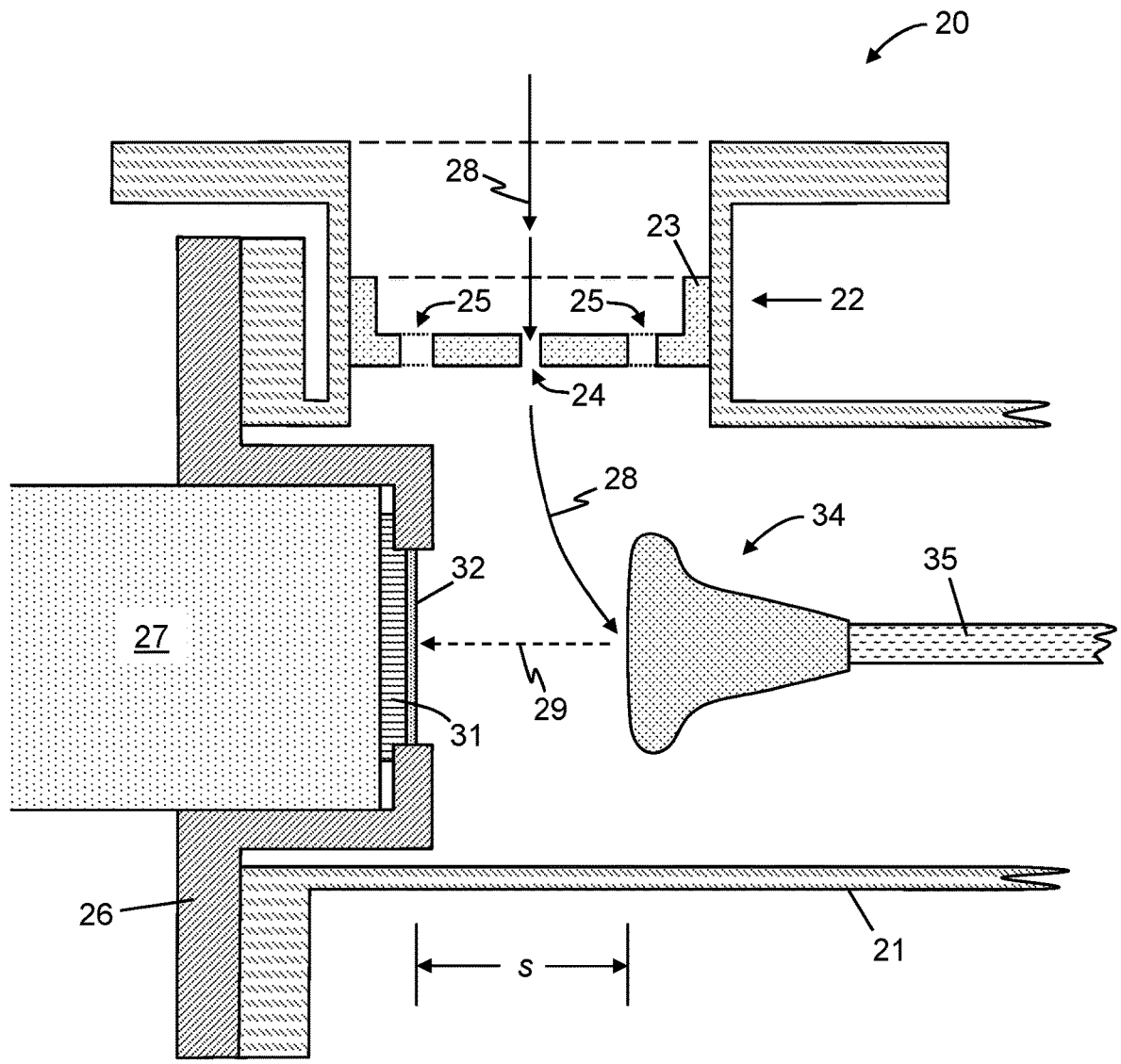
FIG. 2 is a schematic depiction of a conventional Daly detector for a mass spectrometer system.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features and advantages of the present invention in greater detail, please refer to FIGS. 1-3, 4A-4B, 5A-5B, 6A-6B, 7A-7B, 8 and 9 in conjunction with the following discussion.

In the description of the invention herein, it is understood that a word appearing in the singular encompasses its plural counterpart, and a word appearing in the plural encompasses its singular counterpart, unless implicitly or explicitly understood or stated otherwise. Unless otherwise stated, the word "substantially", when used in this document so as to indicate that a quantity X is "substantially" a quantity Y, should be understood to mean that the quantity X is equal to the quantity Y within a five percent tolerance. Furthermore, it is understood that, for any given component or embodiment described herein, any of the possible candidates or alternatives listed for that component may generally be used individually or in combination with one another, unless implicitly or explicitly understood or stated otherwise. It will be understood that any list of candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements.

As used herein, the term "DC", when referring to a voltage applied to one or more electrodes of a mass spectrometer component (such as an ion funnel), does not necessarily imply the imposition of or the existence of an electrical current through those electrodes but is used only to indicate that the referred-to applied voltage either is static or, if non-static, is non-oscillatory and non-periodic. The term "DC" is thus used herein to distinguish the referred-to voltage(s) from applied periodic oscillatory voltages, which themselves may be referred to as either "RF" or "AC" voltages.

In commonly-assigned, co-pending U.S. patent application Ser. No. 16/941,124 titled "Ion-to-Electron Conversion Dynode for Ion Imaging Applications," which was filed on Jul. 28, 2020, Silivra et al. describe conversion dynode devices that can emit an analytically-sufficient quantity of secondary electrons when impacted by either positively-charged or negatively-charged ions. The conversion dynode apparatus described by Silivra et al. is referred to as a micro-Venetian-blind metal channel dynode (or micro-Venetian-blind MCD). Previous general conventional operation of conversion dynodes for the purpose of detecting negative ions has relied on the conversion of a stream of primary negative ions to a stream of secondary positive ions that are subsequently detected. The discovery of the emission of analytically sufficient quantities of secondary electrons, when operated in the negative ion mode as described in Silivra et al. opens up the possibility of implementing a Daly-detector-like detector system that is operable in both the positive-ion and negative-ion modes without the need for additional conversion stages.

Silivra et al. hypothesized that it is generally the case that both secondary protons and secondary electrons are generated upon initial impact of ions (either positive or negative) with any metal channel dynode, but with protons usually being generated in excess of electrons. Silivra et al. further hypothesized that, as a result of inter-particle collisions in the immediate vicinity of the dynode active surface, essentially all of the electrons and some proportion of the more-abundant protons are generally neutralized. If true, this hypothesis can explain why, in general, only a weak beam of protons is observed during operation of metal dynode in conventional negative ion detection mode. Moreover, Silivra et al. further hypothesized that, under the application of an appropriate electric field on the detector side of the conversion dynode, the less-abundant secondary electrons may be successfully separated from the more abundant secondary protons and subsequently be detected.

Figure 3:
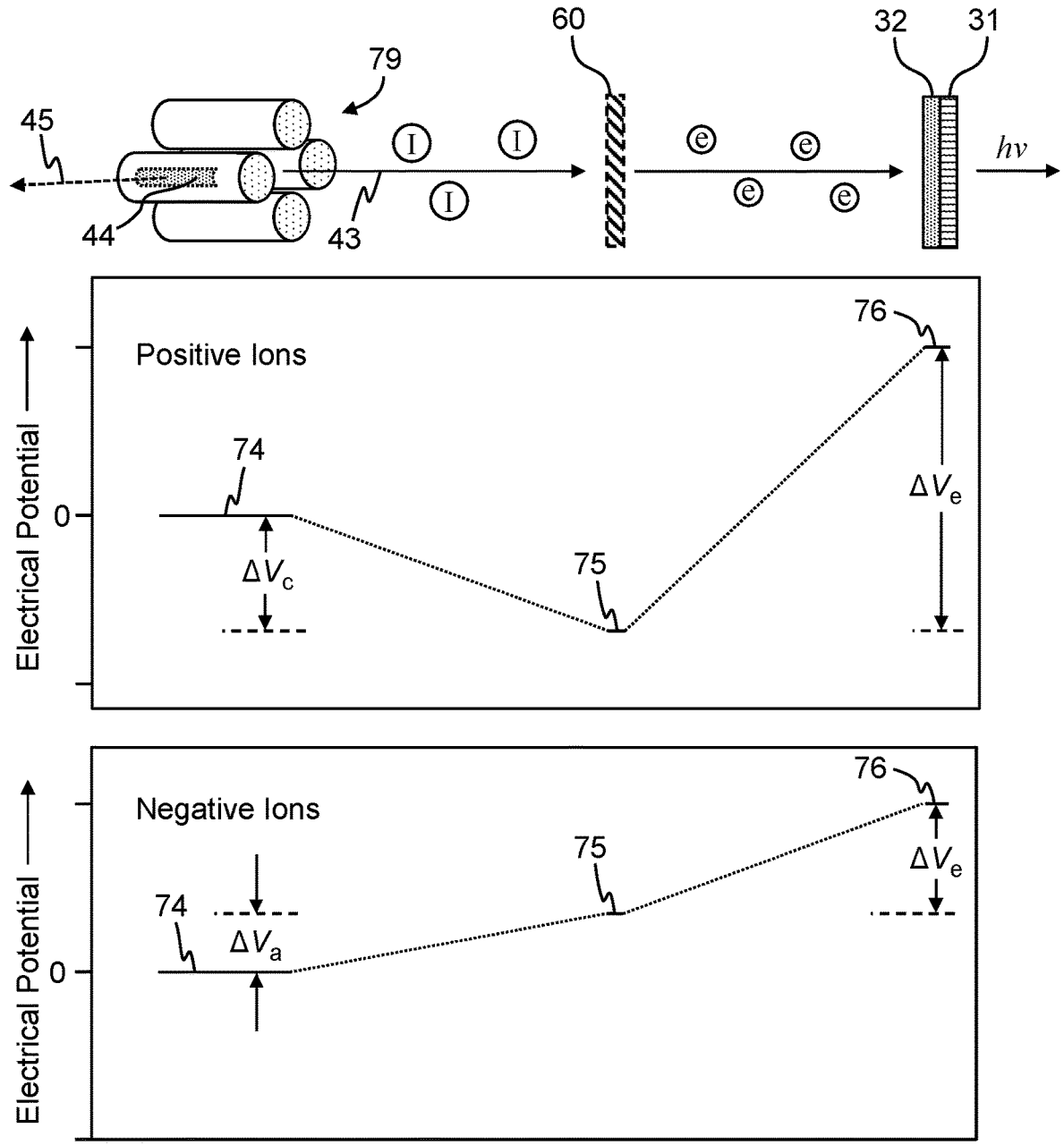
FIG. 3 is a pair of voltage profiles, as taught in U.S. patent application Ser. No. 16/941,124, as may be applied between a mass analyzer, a metal-channel conversion dynode (MCD) and a luminescent phosphor component of a mass spectrometer (upper diagram) for the detection of positive ions emitted from the mass analyzer (uppermost voltage profile) and the detection of negative ions emitted from the mass analyzer (lowermost voltage profile)

The topmost portion of FIG. 3 is a schematic depiction of the use of a so-called micro-Venetian MCD, as taught by Silivra et al. In this diagram, ions, I, are depicted as emitted, for example, from an exit end of a mass analyzer 79, such as a quadrupole mass analyzer. However, the use of the micro-Venetian-blind MCD 60 is not limited to this or any other particular mass analyzer configuration. As another example, ions may be emitted in a direction that is transverse to the quadrupole rods of the mass analyzer 79, such as by means of a slot 44 in one of the rods, in which case, the ions are emitted along trajectory 45. In such an alternative case, the micro-Venetian-blind MCD 60, scintillator 31 and scintillator electrode 31 would be disposed along the trajectory 45 and the exemplary electrical potential profiles depicted in the mid-portion and lowermost portion of FIG. 3 will still be applicable.

The middle and lowermost diagrams of FIG. 3 are schematic depictions of voltage profiles as may be employed for the detection of positive and negative ions, respectively, emerging from a mass analyzer when employing a micro-Venetian-blind MCD 60, as described by Silivra et al. The uppermost voltage profile of FIG. 3 is appropriate for the detection of positively charged ions. A negative electrical potential bias of the MCD relative to the mass analyzer 79, by an amount $\Delta V_c$, causes the positive ions to be attracted to and to impact the MCD device. Secondary electrons generated by the impact energy are then extracted from the MCD 16 and towards the scintillator electrode 32 and scintillator 21 as a result of the positive bias of scintillator electrode 32 by an amount, $\Delta V_e$, relative to the micro-Venetian-blind MCD 60. Conversely, when using the micro-Venetian-blind MCD 60 to detect negative ions, it is necessary to apply a voltage profile of the form shown in the lowermost portion of FIG. 3, in which the MCD is positively biased relative to the mass analyzer and the phosphor electrode is further positively biased relative to the MCD by an amount, $\Delta V_e$.

In this document, the present inventors apply the teachings of Silivra et al. to an expansion of the use of Daly detectors. FIGS. 4A-4B and 5A-5B schematically depict a modified Daly detector 80 in accordance with the present teachings that may be operated in both positive-ion and negative-ion detection modes. Components 41 and 42, shown with dashed outlines, are not portions of the detector apparatus 80 but are, instead, components of an ion trap apparatus that may supply ions, either positive or negative, to the detector. Specifically, component 41 is a slotted quadrupole rod electrode (depicted in cross section) of a linear ion trap mass analyzer and component 42 is an extraction electrode (also depicted in cross section) of the same mass analyzer. In known fashion, application of an alternating-current (AC) resonant excitation voltage to rods of the linear ion trap mass analyzer may cause ions to be selectively ejected from the mass analyzer through the slot 44 in the quadrupole rod electrode 41. Application of an extraction voltage to the extraction electrode 42 urges the ejected ions along ion path 45 (cf. topmost portion of FIG. 3). Although the modified Daly detector 80 is depicted as receiving ions from an ion trap mass analyzer, this detector may be utilized to detect ions derived from any suitable provider of ions.

The modified Daly detector 80, proper, comprises a metal casing 81*a*, two of the walls of which are illustrated in FIGS. 4A-4B and 5A-5B. The interior of the casing 81*a* is under the same high vacuum as the mass analyzer. Upon approaching the modified Daly detector 80, ions that are ejected from the linear ion trap mass analyzer are caused to closely follow trajectory 45 by the action of focusing-lens 83. Note that, since ions may be emitted from the linear ion trap at any point along a slotted aperture 44, the ion paths are not constrained to follow a single line, as might be suggested by the line 45 in FIGS. 4A and 5A but, instead, are essentially constrained by the focusing lens 83 to remain within a plane that is perpendicular to the plane of the drawings and includes the line 45. Each of FIGS. 4A, 4B, 5A and 5B depicts the focusing lens 83 as comprising pair of separate electrodes 89 that are structurally supported by one or more electrically insulating support structures 81*b*. The two electrode components 89 may, in some embodiments, be joined as a single-piece electrode. The two electrodes 89, if present, are electrically coupled to one another and are maintained at the same electrical potential. An electrical potential difference between the slotted quadrupole rod electrode 41 and a dynode 160 causes the ions to continue along trajectories that cause them to impact the dynode 160. Secondary electrons emitted from the dynode 160 are then urged towards a scintillator 31 by a suitable applied electrical potential difference between the dynode 160 and a scintillator electrode 32. Preferably, but not necessarily, the scintillator electrode is formed as a thin-film metal coating on a face of the scintillator 31 that is sufficiently thin to allow electrons to penetrate into the scintillator and stimulate the emission of photons from the scintillator material. A number of suitable scintillator materials are well known to those of ordinary skill in the art and include various synthetic rare-earth-doped single crystals, polycrystalline materials and glasses. The emitted photons are detected by photodetector 27. The photodetector may comprise any device that may suitably detect wavelengths of light emitted by the scintillator. Accordingly, the photodetector may comprise, without limitation, a photomultiplier tube or any suitable semiconductor light sensor device, either as a standalone sensor or as a plurality of individual sensors in an array format. Suitable semiconductor light sensor devices include, without limitation, solid-state silicon photomultipliers, charge-coupled devices, active-pixel sensors and photodiodes of various types.

Preferably, the dynode of the modified Daly detector 80 is fabricated from a metal, such as stainless steel. The shape of the dynode 160 is not restricted to any particular form. However, the inventors have found that optimal performance is achieved if the surface of the dynode 161 onto which the incident ions are directed is a concave, reentrant surface, thereby causing the dynode to be in the form of a shallow bowl or cup. In order to make the detector 80 as compact as possible, the normal line to the electron-receiving surface of the scintillator is preferably disposed at an angle of substantially ninety degrees relative to the trajectory 45 of the incoming ions. Alternatively, a line passing through both the center of the electron-receiving surface and the center of the surface 161 is preferably disposed at an angle of substantially ninety degrees to a line that passes through both the center of the surface 161 and the center of the ion focusing lens 83.

Charged-particle trajectory calculations (discussed further below) indicate that, for optimum results, the dynode 160 should preferably disposed at a tilt angle, $\alpha$, that is in the range of 20-30 degrees, inclusive. In the illustrated example, the tilt angle, $\alpha$, is the angle that is made between the incoming ion trajectory 45 and a plane that is tangent to the concave surface 161 at the center of the surface. If the surface of the dynode onto which the incident ions are directed is convex, then the tilt angle would be defined in terms of the tangent plane at the center of that surface; if the surface is flat, then the tangent plane is identical to the plane of the surface.

If the photodetector 27 comprises a photomultiplier-tube detector, then, preferably, the interior of the photomultiplier-tube detector 27 should be isolated from the vacuum environment inside the casing 81a. Most commercial photomultiplier-tube detectors are provided within a hermetically sealed package having a transparent window for reception of photons. In such instances, the hermetically sealed package can isolate the photomultiplier-tube components from contaminants within the casing 81a. Otherwise or in addition, the photomultiplier-tube detector 27 may be disposed completely outside of the casing 81a. Regardless of whether the photodetector 27 comprises a photomultiplier tube or some other type of detector, one or more optically transmissive components 91, such as a window, may be provided within or as part of the casing in order to provide an optical line of sight between the scintillator 31 and a photodetector 27 that is disposed outside of the casing 81a. The one or more optically transmissive components 91 may be provided in order to facilitate optical coupling regardless of whether the photodetector 27 is disposed inside of or outside of the casing 81a. The optically transmissive components may include any number of windows, lenses, fiber optics, prisms, filters, anti-reflection coatings, gratings, etc.

One way in which the modified Daly detector 80 (FIGS. 4A, 4B, 5A, 5B) differs from the conventional Daly detector (e.g., FIG. 2) is through the provision of a focusing-lens electrode or electrodes at the ion inlet of the detector 80. The configuration of the focusing-lens electrode or electrodes 89 may vary depending on the particular configuration of a mass analyzer ion outlet from which the detector receives ions. For example, if the mass analyzer comprises a quadrupole from which the ions are emitted axially, similar to trajectory 43 illustrated in FIG. 3, then the focusing-lens 83 may comprise a simple ring electrode, a tube lens, or a plate electrode having an aperture, preferably a circular aperture. Alternatively, if the ions are emitted radially from a slot 44, similar to trajectory 45 illustrated in FIGS. 3, 4A and 5A, then the focusing-lens 83 may be configured under the assumption that ions may be ejected from the mass analyzer along the length of the slot.

Figure 6A:
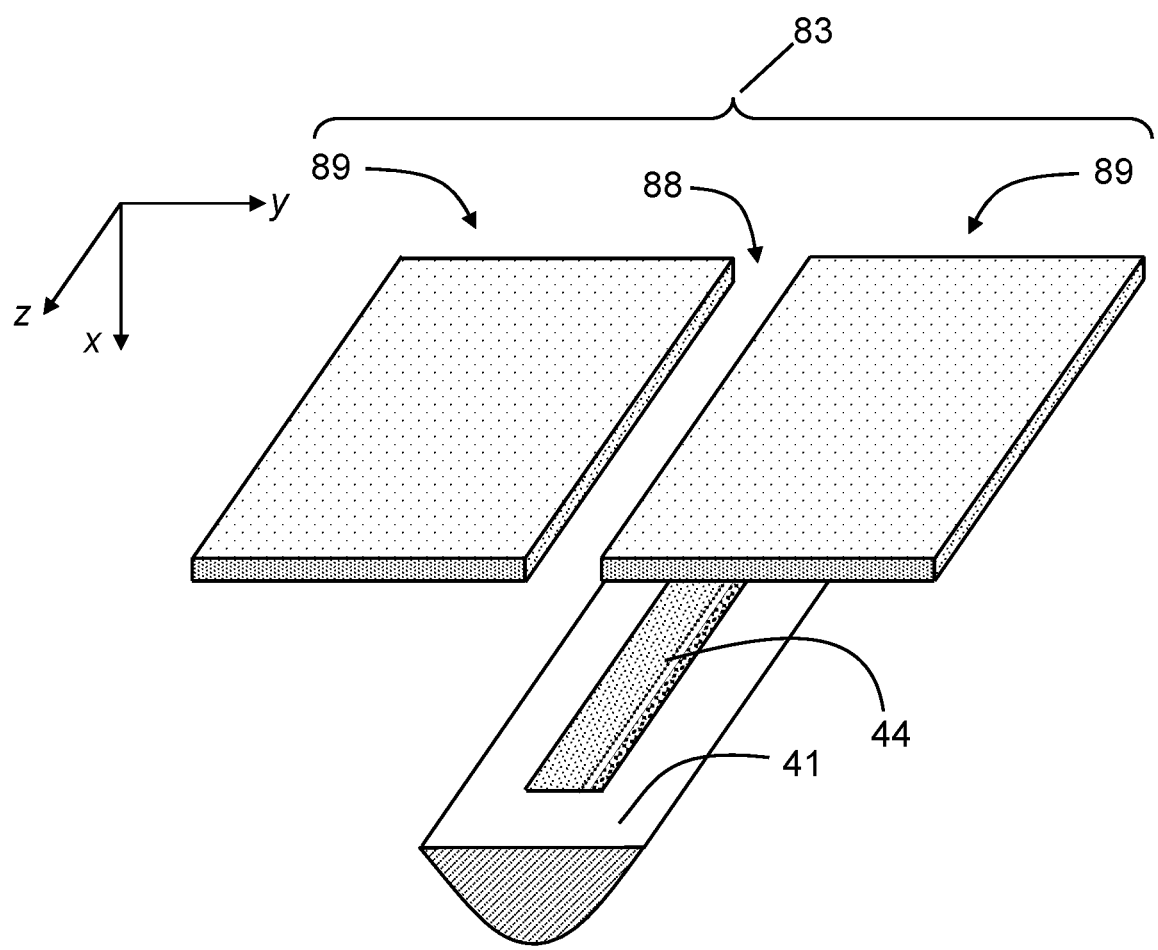
FIG. 6A is schematic depiction of an ion lens of the Daly detector of FIGS. 4A-4B and 5A-5B.
Figure 6B:
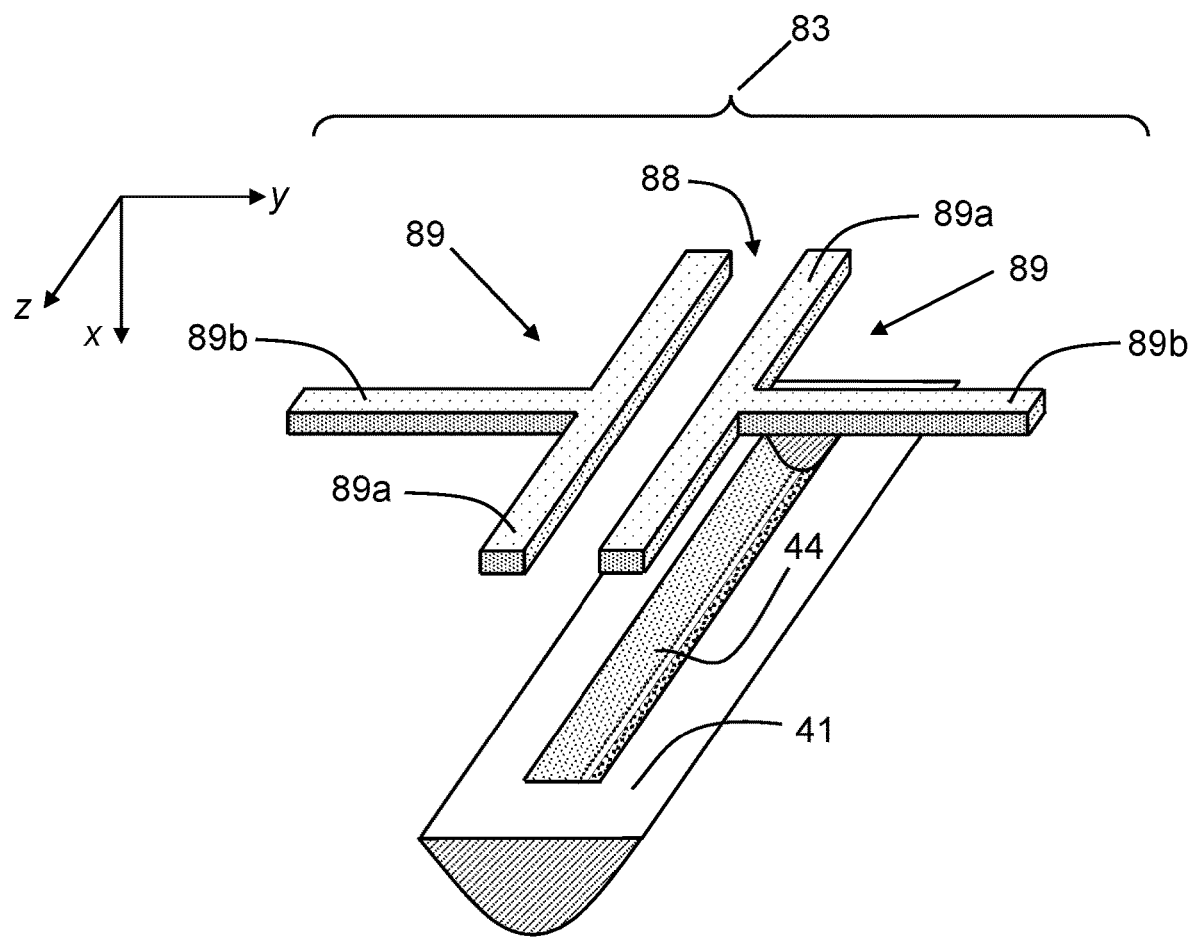
FIG. 6B is schematic depiction of an alternative ion lens of the Daly detector of FIGS. 4A-4B and 5A-5B.

FIGS. 6A-6B show different possible shapes of the electrodes 89 of the focusing lens 83. The electrodes 89 shown in FIG. 6A are plates that are separated by a gap 88 that is aligned parallel with the slot 44 of the rod electrode 41 from which ions are emitted. The electrodes 89 depicted in FIG. 6B comprise an alternative configuration having parallel bar-like or rod-like protrusions 89b that have a gap 88 therebetween that is aligned parallel with the slot 44. The electrodes 89 as shown in FIG. 6B may be wires or metallic deposits that are affixed to a printed circuit board (not shown) that has a slot with edges that essentially align with the edges of the gap 88.

The simulated trajectories of a large number of individual ions that are emitted from the electrode slot 44 along its entire length been modeled using Simion® ion optics simulation software. The envelope of calculated simulated trajectories of incoming positive ions, as projected onto the plane of the drawing (the x, y plane; cf. FIGS. 6A and 6B), is represented by spatial region 84 in FIG. 4A. Likewise, the envelope of calculated simulated trajectories of incoming negative ions is, as projected onto the plane of the drawing, is represented by spatial region 86 in FIG. 5A. The outline of each of the envelopes 84, 86 encloses more than ninety percent of the calculated trajectories of the respective ions. The modelling of the trajectories of the positive ions (FIG. 4A) and of the resulting emitted secondary electrons (FIG. 4B) was performed assuming applied voltages of −12000 V at the focusing-lens electrode(s), −12000 V at the dynode 160 and +8000 V at the scintillator electrode 32. The modelling of the trajectories of the negative ions (FIG. 5A) and of the resulting emitted secondary electrons (FIG. 5B) was performed assuming applied voltages of +12000 V at the focusing-lens electrode(s), +12000 V at the dynode 160 and +16000 V at the scintillator electrode 32. Separate simulations of ion trajectories were performed assuming the absence of any focusing-lens electrodes.

Figure 4A:
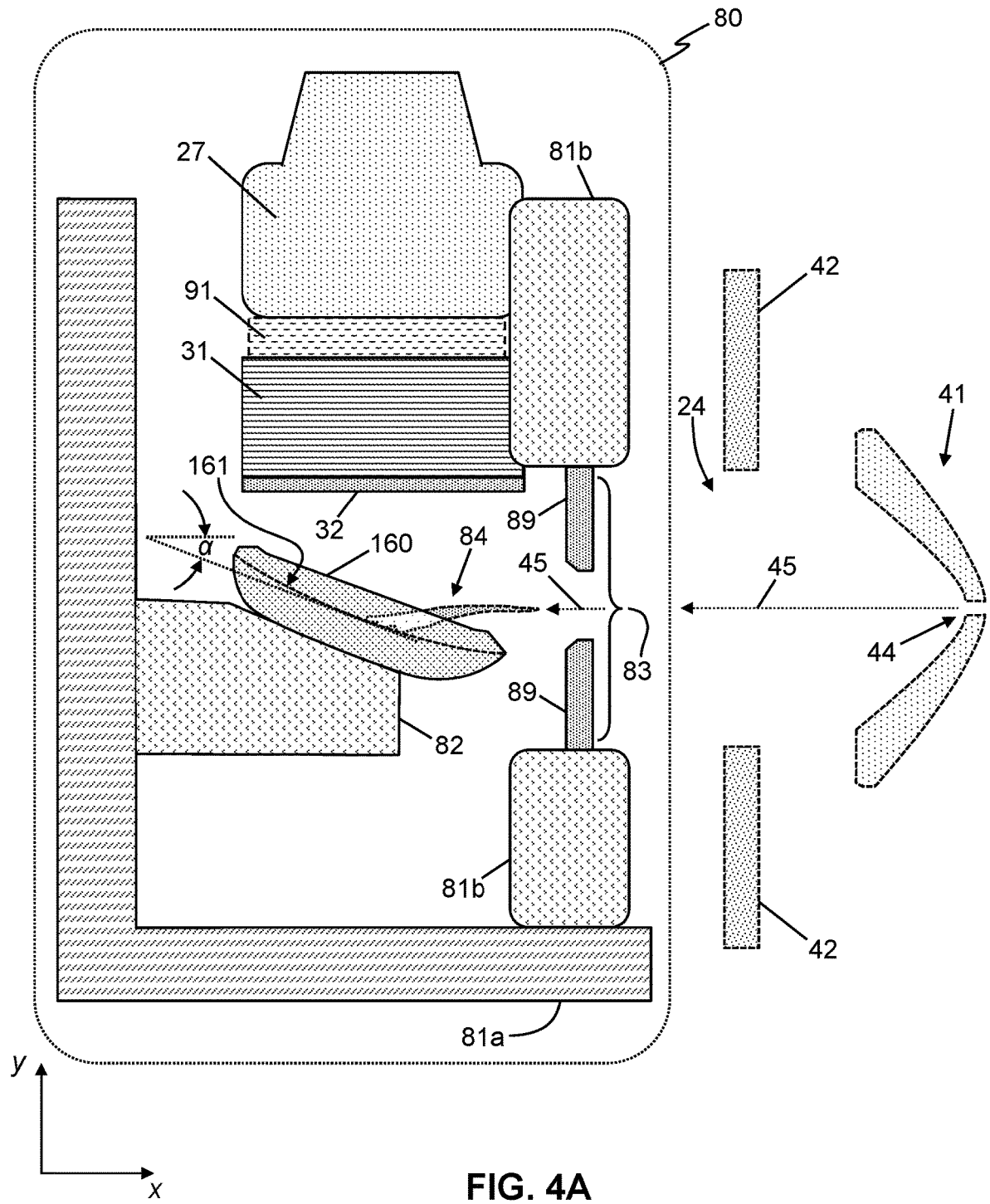
FIG. 4A is a schematic elevation view of a modified Daly detector in accordance with the present teachings showing an envelope of calculated trajectories of positively-charged ions incident into the detector from an outlet slit of a linear ion trap.
Figure 4B:
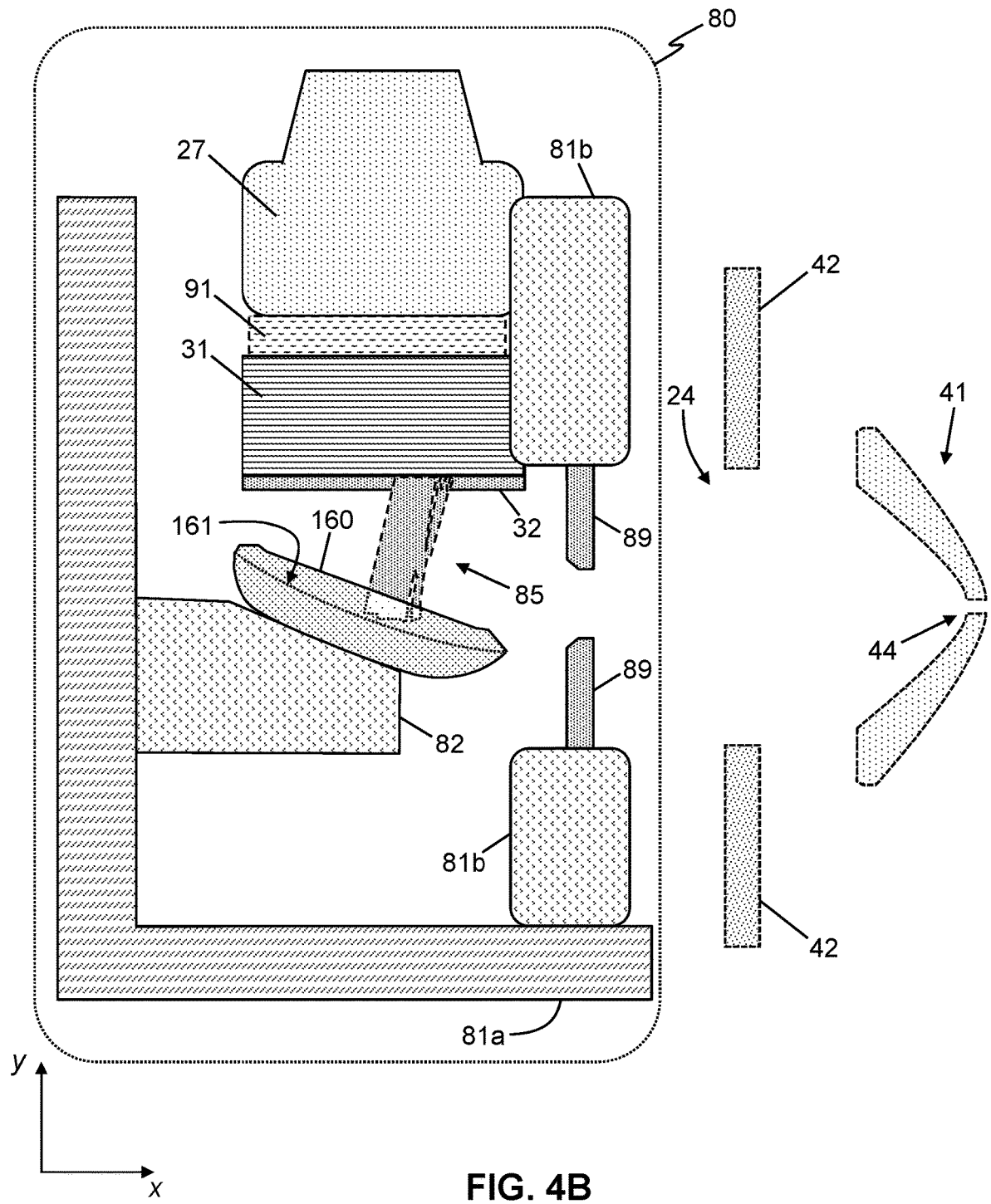
FIG. 4B is the schematic Daly detector depiction of FIG. 4A, showing an envelope of calculated trajectories of secondary electrons emitted from a dynode of the detector onto a metallized scintillator.
Figure 5A:
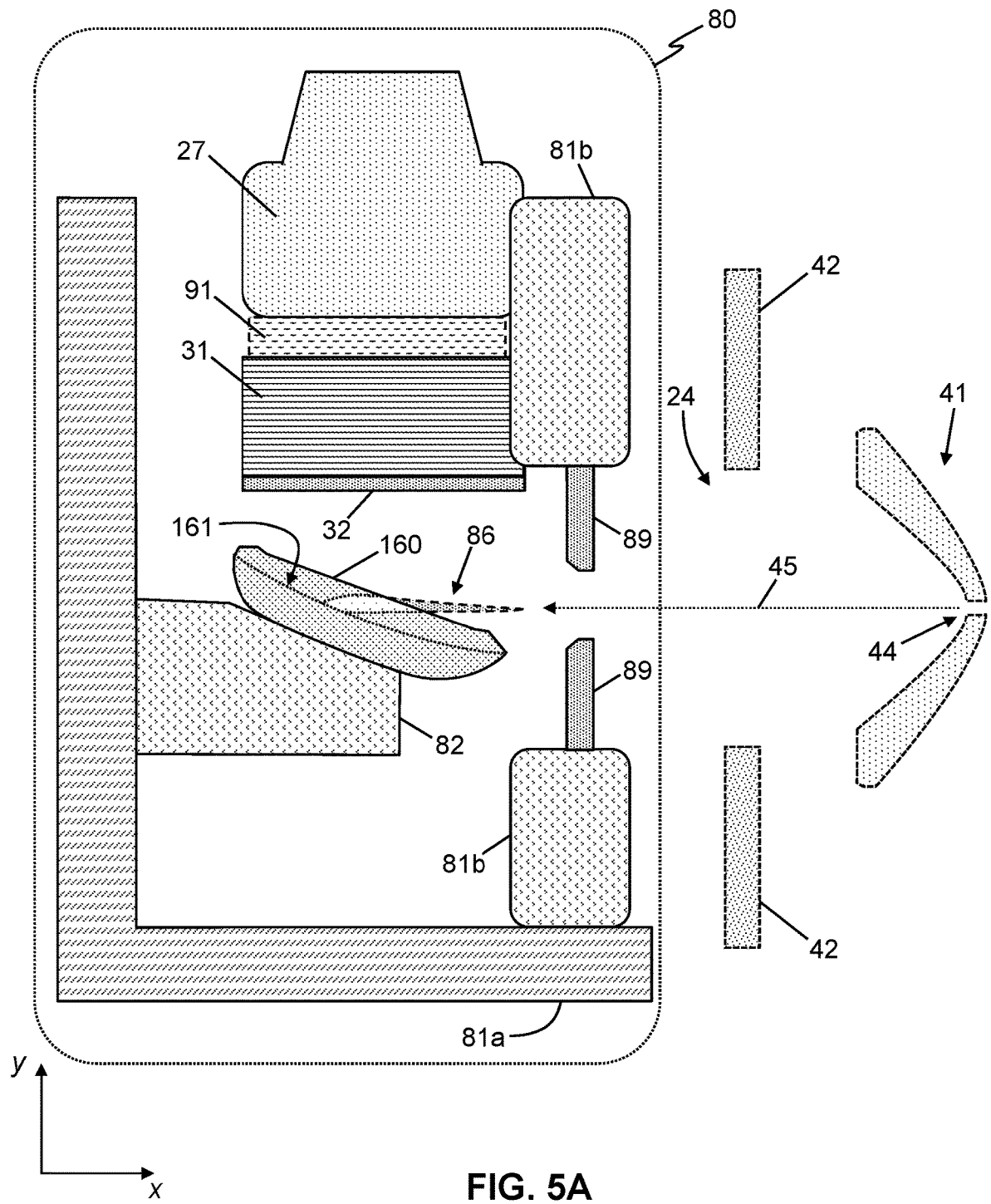
FIG. 5A is the schematic Daly detector depiction of FIG. 4A, showing an envelope of calculated trajectories of negatively-charged ions incident into the detector from an outlet slit of a linear ion trap.
Figure 5B:
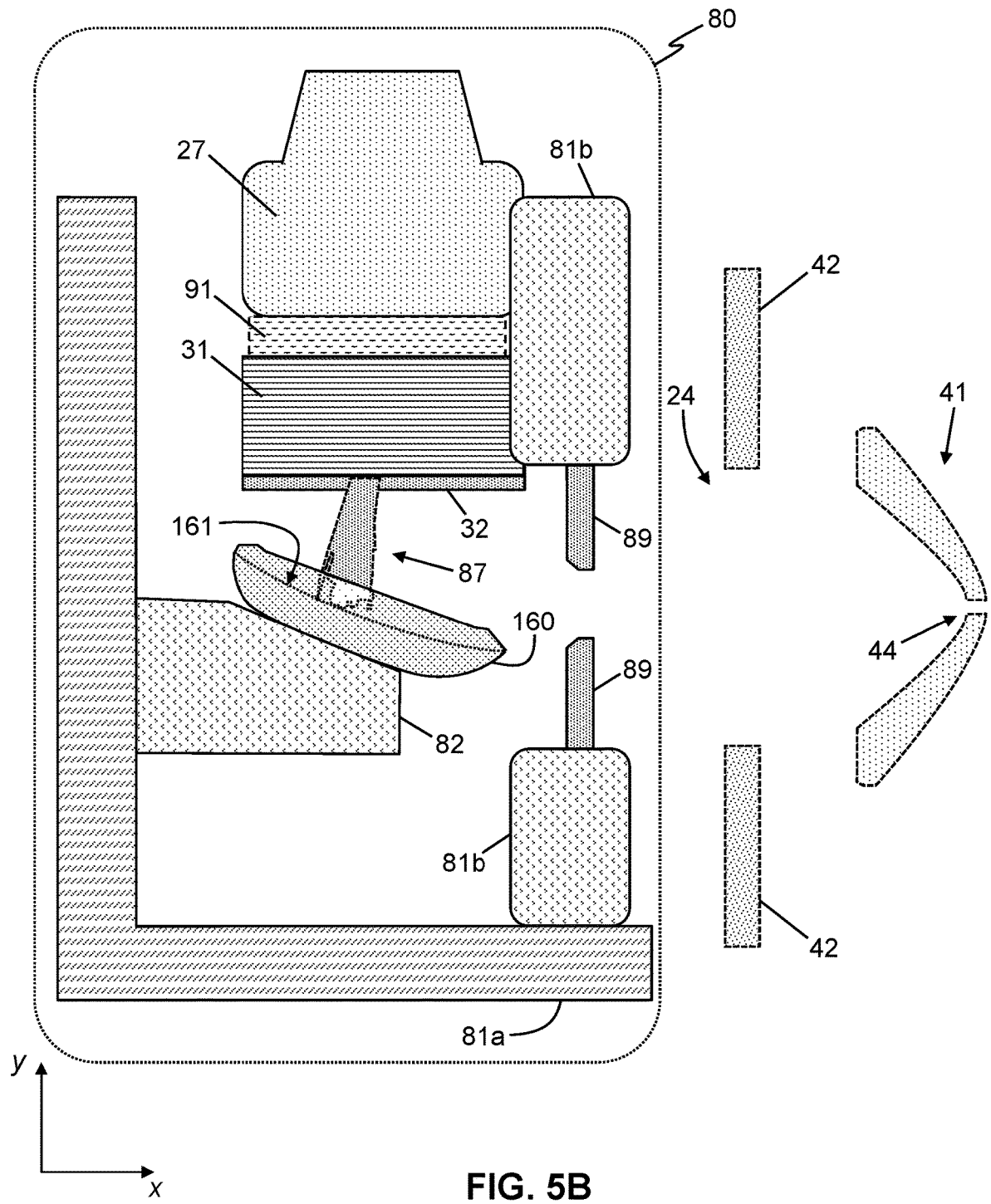
FIG. 5B is the schematic Daly detector depiction of FIG. 4A, showing an envelope of calculated trajectories of secondary electrons emitted from a dynode of the detector onto a metallized scintillator.
Figure 7A:
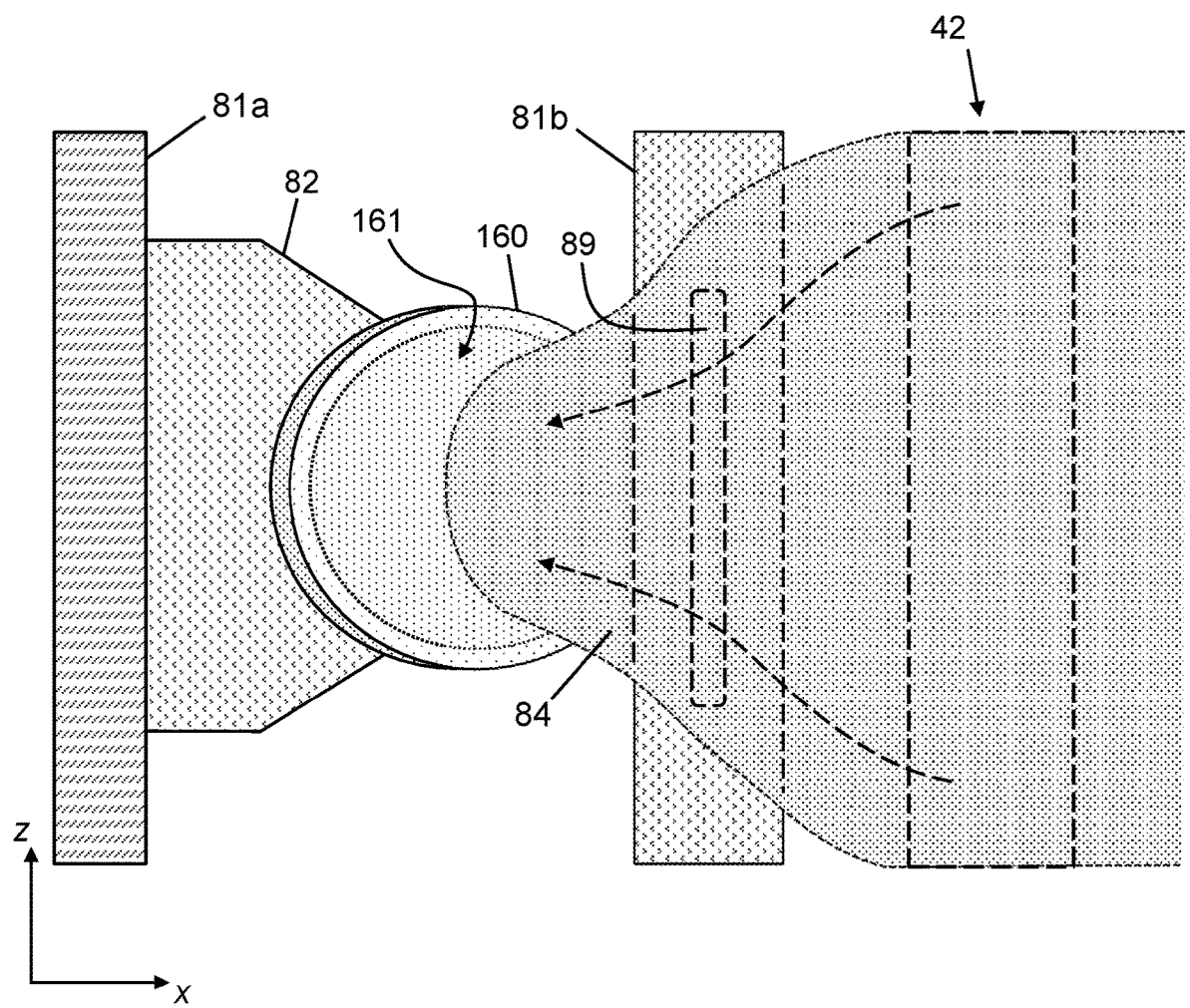
FIG. 7A is a schematic top view of a portion of the Daly detector of FIGS. 4A-4B and 5A-5B showing an envelope of calculated ion trajectories of positively-charged ions incident onto a dynode of the detector from an outlet slit of a linear ion trap.
Figure 7B:
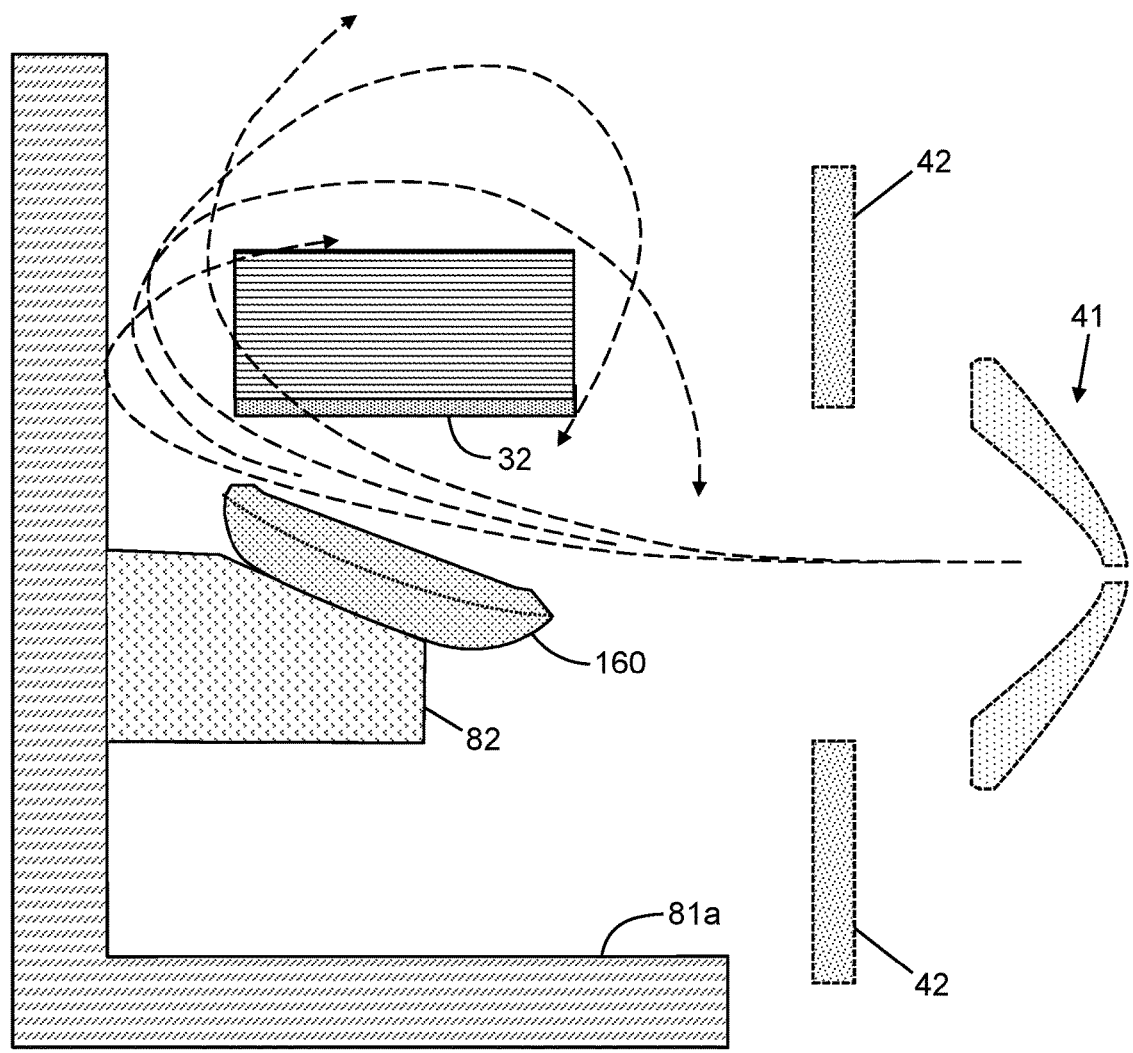
FIG. 7B is a schematic elevation view of a Daly detector that differs from the Daly detector of FIGS. 4A-4B and 5A-5B in that the focusing lens is removed, the view also showing representative calculated trajectories of positively-charged ions incident into the detector from an outlet slit of a linear ion trap.

The simulated trajectories of incoming ions indicate that, under the influence of the electrical potential applied to the focusing-lens electrode(s) 83, essentially all of the incoming ions, either positive or negative, strike the dynode 160 within its central region. The beneficial effect of the focusing lens may be observed by comparing the simulation results depicted in FIGS. 4A and 7A, which account for the presence of the focusing lens, with the simulated results in FIG. 7B, which assume the absence of a focusing lens. Note that FIGS. 4A and 7A both pertain to the same set of simulation data, relating to the introduction of positively-charged ions into the apparatus 80. FIG. 4A shows the envelope of calculated trajectories in side elevational view (i.e., as projected onto the x, y plane) and FIG. 7A shows the envelope in top view (i.e., as projected onto the x, z plane). FIG. 7B illustrates a few representative calculated ion trajectories that were calculated under the assumption that no focusing lens is present. In this case, the full envelope of all simulated trajectories is too complex to easily display. Note that, since the trajectories are projected onto the plane of the drawing, the ion trajectories that appear to pass "through" certain components represent trajectories that are either in front of or behind the particular component, in three dimensions. Generally speaking, the simulations indicate that, when using the negative ion detection mode in the absence of the focusing lens, only a small proportion of the incoming ions impact upon the dynode 160. The remainder of the incoming ions are deflected away from the dynode by the attractive potential of the positively biased scintillator. This result is due to: (a) the influence of the electric field of the scintillator, which is otherwise partially shielded by the focusing lens; and (b) the lower kinetic energy and velocity of the incoming negatively charged ions in the absence of the focusing lens. Because of the latter factor, the ions lack sufficient kinetic energy, in the absence of the focusing lens, to maintain their trajectories when they see the potentials from the dynode and the scintillator.

The focusing lens 83 of the illustrated detector configuration provides two functions. Firstly, it serves as the incoming ion accelerator and helps to partition the field as described above. Secondly, it acts as a beam-shaping ion optic that converges the spread of incoming primary ions to a well-focused beam, thereby resulting in higher detection efficiency. Because of these functions provided by the focusing lens, the dynode may be moved much closer to the mass analyzer than would otherwise be possible while still achieving adequate focusing.

After identifying impact zones of both positive and negative ions on the dynode 160 by ion trajectory simulations, the inventors utilized the identified impact zones as to set boundary conditions for calculations of the trajectories of secondary electrons emitted from the dynode. The envelopes of the calculated electron trajectories are shown as envelope 85 (FIG. 4B) for electrons emitted in response to a flux of positive ions and envelope 87 (FIG. 5B) for electrons emitted in response to a flux of negative ions. The outline of each of the envelopes 85, 87 encloses a substantial portion of the calculated trajectories of the corresponding respective secondary electrons. The electrode voltages that were assumed for purposes of the calculations are given in the discussion above.

Additional ion-trajectory and electron-trajectory simulations (not shown) using different inter-electrode spacings indicate that the scintillator needs to be placed close enough to the dynode (e.g., within about 7 mm, depending on the applied voltages) to ensure minimum field penetrations from the other electrodes that would otherwise distort the extraction field. At the same time, in order to prevent electrical arcing, there is a minimum allowable minimum distance (approximately 3-4 mm, depending on the applied voltages) at the point of closest approach (i.e. the left side of dynode 160, as depicted in the drawings) of the dynode to the scintillator electrode 32. Further, the results of the simulations indicate that optimal results are achieved when the dynode and focusing lens are maintained at substantially a same electrical potential and when the scintillator electrode is maintained at a potential that is slightly more "positive" than (or slightly less negative than) the potential of the dynode. By meeting these constraints, the simulation indicate that this detector can perform effectively for detection of both positive and negative ions.

Figure 8:
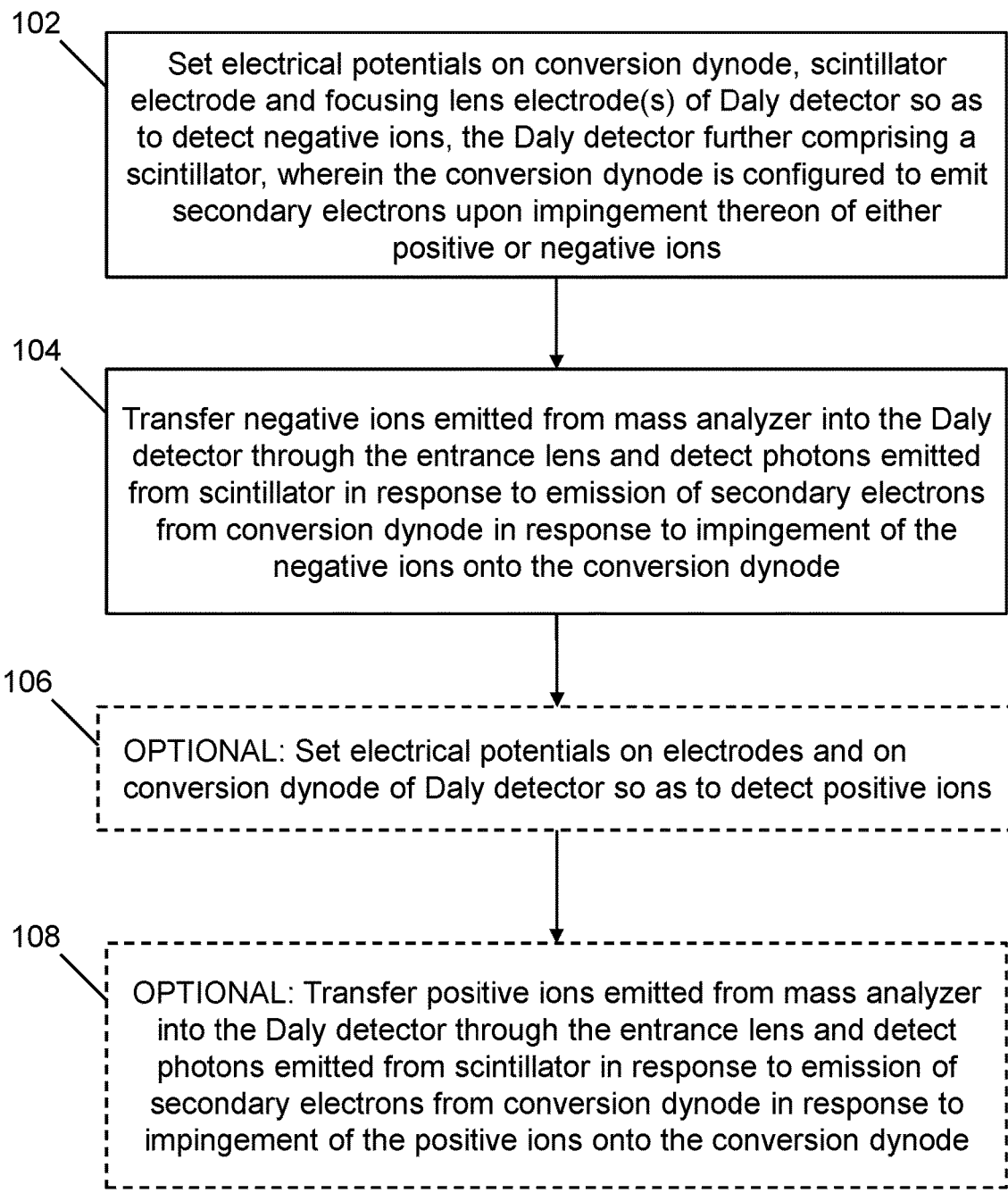
FIG. 8 is a flow diagram of a first method of operating a mass spectrometer including a Daly detector in accordance with the present teachings.
Figure 9:
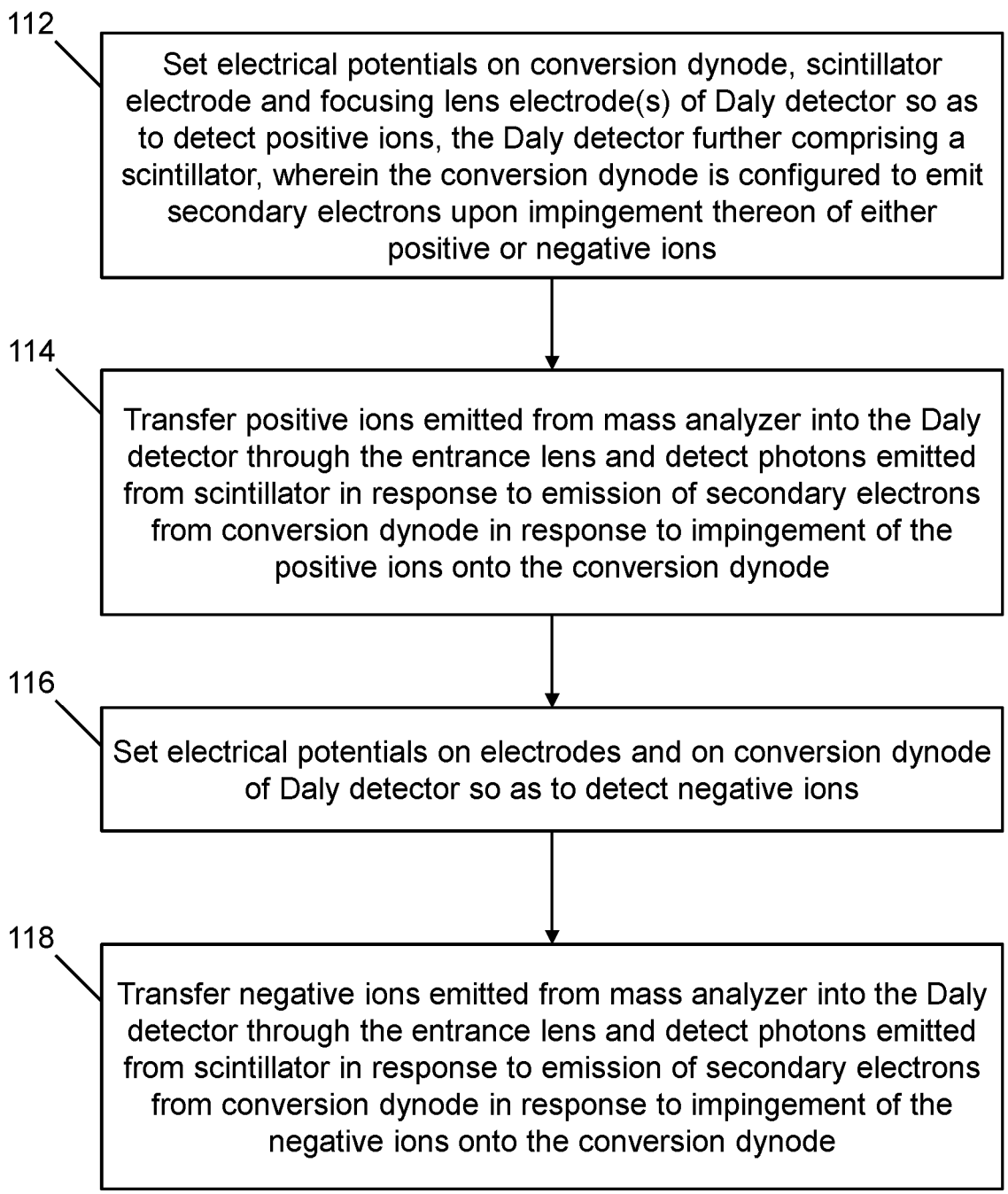
FIG. 9 is a flow diagram of a second method of operating a mass spectrometer including a Daly detector in accordance with the present teachings.

FIGS. 8 and 9 are flow diagrams of methods for detecting ions emitted from a mass analyzer in accordance with the present teachings. Initial Step 102 of the method 100 (FIG. 8) comprises setting electrical potentials applied to a conversion dynode, a scintillator electrode and a focusing lens or electrode of a Daly detector so as to detect negative ions, wherein the Daly detector further comprises a scintillator and a photodetector and wherein the conversion dynode comprises a physical configuration that causes it to emit secondary electrons upon impingement thereon of either positive ions or negative ions, depending upon the applied voltages. In the subsequent step 104, negatively-charged ions emitted from a mass analyzer are transferred into the Daly detector through the focusing lens while, at the same time, the photodetector detects photons emitted from the scintillator in response to the reception of secondary electrons emitted from the conversion dynode in response to impingement of negative ions onto the conversion dynode. The photodetector may comprise any device that may suitably detect wavelengths of light emitted by the scintillator. Accordingly, the photodetector may comprise, without limitation, a photomultiplier tube or any suitable semiconductor light sensor device, either as a standalone sensor or as a plurality of individual sensors in an array format. Suitable semiconductor light sensor devices include, without limitation, solid-state silicon photomultipliers, charge-coupled devices, active-pixel sensors and photodiodes of various types.

The method 100 may optionally terminate after execution of the Step 104. However, in an optional extension of the method, positive ions emitted from the mass analyzer may be detected in optional Steps 106-108. In optional Step 106, the electrical potentials on the electrodes and on the conversion dynode of the Daly detector are reconfigured so as to enable the detector to detect positive ions. Then, in Step 108, positive ions emitted from the mass analyzer are transferred into the Daly detector through the focusing lens while, at the same time, the photodetector detects photons emitted from the scintillator in response to the reception of secondary electrons emitted from the conversion dynode in response to impingement of negative ions onto the conversion dynode.

A related method 110, in accordance with the present teachings, for detecting ions emitted from a mass analyzer is outlined in FIG. 9. The method 110 is similar to the optionally extended version of method 100 (FIG. 8) except that the detection of positive ions occurs prior to the detection of negative ions. Thus, steps 112-114 of the method 110 are analogous to the steps 106-108 of the method 100 and steps 116-118 of the method 110 are analogous to the steps 102-104 of the method 100. Of course, any of the methods outlined in FIGS. 8-9 (i.e., the method 110, the abridged form of method 100 and the extended form of method 100) may be repeated any number of times. Likewise, any sequence of execution of these methods may be performed in any order.

Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:
1. A method of ion detection comprising:
   (a) setting electrical potentials of a dynode and a scintillator electrode of a Daly detector and of a focusing lens disposed at an ion inlet of the Daly detector so as to detect negatively charged ions received at the ion inlet from a mass analyzer or mass filter;
   (b) transferring the negatively charged ions from the mass analyzer or mass filter to the Daly detector through the focusing lens and detecting a first signal that corresponds to detection of the negatively charged ions by a photodetector of the Daly detector;

(c) setting electrical potentials of the dynode, the scintillator electrode and the focusing lens of the Daly detector so as to detect positively charged ions received at the ion inlet from the mass analyzer or mass filter; and
(d) transferring the positively charged ions from the mass analyzer or mass filter to the Daly detector through the focusing lens and detecting a second signal that corresponds to detection of the positively charged ions by the photodetector of the Daly detector,
wherein the dynode has a surface configured to intercept, within a zone of interception, the negatively charged ions upon the passing of the negatively charged ions through the ion focusing lens, wherein a plane that is tangent to the dynode surface at the zone of interception is disposed at an angle to a line that passes through the center of the dynode surface and the center of the focusing lens.

2. A method of ion detection as recited in claim 1, wherein the angle is within the range of twenty degrees to thirty degrees, inclusive.

3. A method of ion detection as recited in claim 1, wherein the dynode surface is a concave reentrant surface.

4. A method of ion detection as recited in claim 1, wherein a line that passes through the center of the dynode surface and the center of the scintillator surface makes an angle of substantially ninety degrees with the line that passes through the center of the dynode surface and the center of the focusing lens.

5. A method of ion detection as recited in claim 1, wherein, in the step (a), the setting of the electrical potential of the ion lens comprises setting the electrical potential of a tube lens or a ring lens that is configured to intercept ions emitted axially from a multipole mass analyzer or mass filter.

6. A method of ion detection as recited in claim 1, wherein, in the step (a), the setting of the electrical potential of the ion lens comprises setting the electrical potential of an ion lens that comprises a pair of electrodes, each electrode having an edge, the edges aligned parallel to one another and defining a gap therebetween and wherein the gap is configured to intercept ions emitted radially from a linear ion trap.

7. A method of ion detection as recited in claim 1, wherein,
in the step (a), the setting of the electrical potentials of the dynode, the scintillator electrode and the focusing lens comprises setting of the electrical potentials of a dynode, a scintillator electrode and a focusing lens, all of which are disposed within an evacuated housing, and
wherein, in the step (b), the detecting of the first signal that corresponds to detection of the negatively charged ions by the photodetector comprises detecting the first signal by a photodetector that is disposed outside of the evacuated housing.

8. A method of ion detection comprising:
(a) setting electrical potentials of a dynode and a scintillator electrode of a Daly detector and of a focusing lens disposed at an ion inlet of the Daly detector so as to detect positively charged ions received at the ion inlet from a mass analyzer or mass filter;
(b) transferring the positively charged ions from the mass analyzer or mass filter to the Daly detector through the focusing lens and detecting a first signal that corresponds to detection of the positively charged ions by a photodetector of the Daly detector;
(c) setting electrical potentials of the dynode, the scintillator electrode and the focusing lens of the Daly detector so as to detect negatively charged ions received at the ion inlet from the mass analyzer or mass filter; and
(d) transferring the negatively charged ions from the mass analyzer or mass filter to the Daly detector through the focusing lens and detecting a second signal that corresponds to detection of the negatively charged ions by the photodetector of the Daly detector
wherein the dynode has a surface configured to intercept, within a zone of interception, the positively charged ions upon the passing of the ions through the ion focusing lens, wherein a plane that is tangent to the dynode surface at the zone of interception is disposed at an angle of twenty degrees to thirty degrees, inclusive, to a line that passes through the center of the dynode surface and the center of the focusing lens.

9. A method of ion detection as recited in claim 8, wherein the dynode surface is a concave reentrant surface.

10. A method of ion detection as recited in claim 8, wherein a line that passes through the center of the dynode surface and the center of the scintillator surface makes an angle of substantially ninety degrees with the line that passes through the center of the dynode surface and the center of the focusing lens.

11. A method of ion detection as recited in claim 8, wherein, in the step, the setting of the electrical potential of the ion lens comprises setting the electrical potential of a tube lens or a ring lens that is configured to intercept ions emitted axially from a multipole mass analyzer or mass filter.

12. A method of ion detection as recited in claim 8, wherein, in the step (a), the setting of the electrical potential of the ion lens comprises setting the electrical potential of an ion lens that comprises a pair of electrodes, each electrode having an edge, the edges aligned parallel to one another and defining a gap therebetween and wherein the gap is configured to intercept ions emitted radially from a linear ion trap.

13. A method of ion detection as recited in claim 8, wherein,
in the step (a), the setting of the electrical potentials of the dynode, the scintillator electrode and the focusing lens comprises setting of the electrical potentials of a dynode, a scintillator electrode and a focusing lens, all of which are disposed within an evacuated housing, and
wherein, in step (b), the detecting of the first signal that corresponds to detection of the positively charged ions by a photodetector comprises detecting the first signal by a photodetector that is disposed outside of the evacuated housing.

* * * * *